(12) United States Patent  (10) Patent No.: US 8,967,105 B2
Hoppe et al.  (45) Date of Patent: Mar. 3, 2015

(54) CENTRAL VALVE FOR A CAMSHAFT ADJUSTER

(71) Applicant: Schaeffler Technologies AG & Co. KG, Herzogenaurach (DE)

(72) Inventors: Jens Hoppe, Erlangen (DE); David Kohler, Egloffstein (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 59 days.

(21) Appl. No.: 13/760,308

(22) Filed: Feb. 6, 2013

(65) Prior Publication Data

US 2013/0213330 A1  Aug. 22, 2013

(30) Foreign Application Priority Data

Feb. 20, 2012  (DE) .......................... 10 2012 202 520

(51) Int. Cl.
*F01L 1/34* (2006.01)
*F01L 1/344* (2006.01)
*F16K 27/00* (2006.01)

(52) U.S. Cl.
CPC ............... *F01L 1/344* (2013.01); *F01L 1/3442* (2013.01); *F16K 27/00* (2013.01); *F01L 2001/34426* (2013.01); *F01L 2001/34433* (2013.01); *F01L 2103/00* (2013.01)
USPC .................................. 123/90.17; 137/625.25

(58) Field of Classification Search
CPC . F01L 1/34; F01L 1/3442; F01L 2001/34483; F01L 2001/3443; F01L 2001/34433; F01L 2001/34426
USPC ............. 123/90.15, 90.17, 90.31; 137/625.25
See application file for complete search history.

(56) References Cited

U.S. PATENT DOCUMENTS

2008/0149056 A1* 6/2008 Grunow ..................... 123/90.17
2012/0111296 A1  5/2012 Hoppe et al.

FOREIGN PATENT DOCUMENTS

DE  102009051309  5/2011
EP  1544419  6/2005
WO  2007082600  7/2007
WO  2011003682  1/2011

* cited by examiner

*Primary Examiner* — Zelalem Eshete
(74) *Attorney, Agent, or Firm* — Volpe and Koenig, P.C.

(57) ABSTRACT

A central valve (1) of a camshaft adjuster (9) is provided having a deep drawn housing (2).

8 Claims, 3 Drawing Sheets

CENTRAL VALVE FOR A CAMSHAFT ADJUSTER

INCORPORATION BY REFERENCE

The following documents are incorporated herein by reference as if fully set forth: German Patent Application No.: 102012202520.0, filed Feb. 20, 2012.

FIELD OF THE INVENTION

The invention relates to a central valve for a camshaft adjuster.

BACKGROUND

Camshaft adjusters are used in internal combustion engines for varying the control times of the combustion chamber valves, in order to be able to variably shape the phase relation between a crankshaft and a camshaft in a defined angular range between a maximum advanced position and a maximum retarded position. The adaptation of the control times to the current load and rotational speed reduces consumption and emissions. For this purpose, camshaft adjusters are integrated in a drive train by which a torque is transferred from the crankshaft to the camshaft. This drive train can be constructed, for example, as a belt drive, chain drive, or gearwheel drive.

In a hydraulic camshaft adjuster, the driven element and the drive element form one or more pairs of pressure chambers that act against each other and can be pressurized with hydraulic medium. The drive element and the driven element are arranged coaxially. By filling and emptying individual pressure chambers, a relative movement is generated between the drive element and the driven element. A spring with a rotating effect between the drive element and the driven element forces the drive element in a preferred direction relative to the driven element. This preferred direction can be in the same direction or in the opposite direction to the direction of rotation.

One type of hydraulic camshaft adjuster is the vane cell adjuster. The vane cell adjuster has a stator, a rotor, and a drive wheel with external teeth. As the driven element, the rotor can usually be locked in rotation with the camshaft. The drive element contains the stator and the drive wheel. The stator and the drive wheel are locked in rotation with each other or are alternatively constructed as a single piece. The rotor is arranged coaxial to the stator and within the stator. The rotor and the stator form oil chambers that act in opposite directions with their vanes extending in the radial direction and these chambers can be pressurized by oil pressure and allow a relative rotation between the stator and the rotor. The vanes are constructed either integrally with the rotor or the stator or are arranged as "inserted vanes" in grooves of the rotor or stator provided for this purpose. The vane cell adjusters further have various sealing covers. The stator and the sealing covers are secured with each other by several screw connections.

Another type of hydraulic camshaft adjuster is the axial piston adjuster. Here, a displacement element that generates a relative rotation between a drive element and a driven element by helical gearing is shifted in the axial direction using oil pressure.

DE 10 2009 051 309 A1 shows a device for the camshaft adjustment, wherein the camshaft adjuster contacts against a stop element of the camshaft with its hub and an axial tension between the camshaft adjuster and camshaft is realized by an attachment element. The attachment element is here constructed as a tensioning nut.

WO 2007/082600 shows a camshaft adjuster that is mounted by a central valve constructed as a central screw on a camshaft.

EP 1 544 419 A1 shows a camshaft adjuster that is mounted with a central screw without a valve function on a camshaft.

SUMMARY

The objective of the invention is to provide a central valve whose housing is produced in an especially economical way and also a camshaft adjuster that can be locked in rotation with a camshaft.

This objective is met by a central valve as well as a camshaft adjuster having one or more features of the invention.

The central valve has a housing and a control piston arranged within the housing, wherein the central valve has a supply connection, several work connections, and a tank connection, wherein the control piston controls the flow of hydraulic medium from the supply connection to the work connections. In addition, the central valve has a housing constructed as a screw with a screw head, a screw shaft, and a thread. According to the invention, the objective is met in that the housing constructed as a screw is produced with the screw head, the screw shaft, and the thread by a deep-drawing method.

The central valve is provided for controlling a hydraulic camshaft adjuster and arranged coaxial to the axis of symmetry or rotation of the camshaft adjuster or camshaft. The central valve is also placed within the camshaft adjuster, i.e., the central valve and camshaft adjuster are arranged one on top of the other in the radial direction. Optionally, the camshaft can be arranged between the camshaft adjuster and the central valve.

Within the housing of the central valve there is the control piston. The control piston can move in the axial direction. Thus, the control piston can be positioned in any axial position. The positioning is realized by a central magnet that contacts an end of the control piston with its actuation pin and moves the control piston. Through the axial positioning of the control piston, the different connections of the central valve can be connected to each other hydraulically or separated from each other and thus can communicate with each other or not. For guiding the hydraulic medium between the connections, the control piston and housing are provided with openings, e.g., grooves and/or bores.

The control piston has so-called control edges on its openings that control the flow rate, e.g., directly or indirectly with the edges of the openings of the housing. For controlling the flow rate, the edges of the openings of the housing and these control edges are positioned relative to each other such that an opening of the housing stands opposite an opening of the control piston as much as possible and the overlap of the two openings is varied by the ability of the control piston to be positioned in the axial direction and thus an adjustable flow surface is formed for the hydraulic medium.

Through the invention it is now achieved that the complicated machining of the housing is reduced to a minimum, wherein tool costs and processing time can be saved. Advantageously, through a shaping process, e.g., deep drawing, the edge zones of the walls of the housing and all of the material bends of the housing are provided with increased strength and the surfaces are smoothened. The thread can be formed advantageously by a shaping process, e.g., rolling, wherein the thread flanks can also be reinforced.

The deep-drawing method according to the invention provides shaping a blank using a punch and a die such that a housing is formed as a screw with a screw head, a screw shaft, and a region for the thread, and thus the component is produced advantageously without cutting and thus ideally right off the tool. In addition, an inner peripheral surface is formed that can hold, e.g., a control piston or an inner housing.

Reworking of functional surfaces of the housing that come into contact with components interacting with the housing can nevertheless also be performed. Such functional surfaces can be, for example, an inner peripheral surface with a diameter with tight tolerances whose accuracy is further improved in connection with the deep-drawing process, e.g., by a grinding process. The thread is advantageously rolled in the region provided for this purpose.

The blanks could be, for example, sleeve-shaped or tube-shaped workpieces or semi-finished products with advantageously approximately identical wall thicknesses. Thin-walled plates are also conceivable.

In one construction of the invention, the housing has an inner peripheral surface of constant diameter for guiding the control piston. Preferably, this inner peripheral surface is an off-tool feature generated by a punch or die and is limited in the axial direction at least to the axial stroke required by the control piston. Thus, this guide surface of the housing formed for the control piston has a high surface quality that is advantageously already strengthened sufficiently and thus if necessary a later hardening method can be eliminated.

In one arrangement of the invention, the thread of the housing is constructed as an external thread and has a non-stepped outer lateral surface together with the screw shaft. By using the outer thread, the central valve can be screwed into a camshaft. The non-stepped arrangement of the screw shaft relative to the outer thread has a constant outer lateral surface as much as possible for the screw shaft and outer thread. In this way, the flow of forces through the screw shaft and through the external thread is subject to extremely minimal or no changes in direction, which advantageously reduces or eliminates notch stresses. The thread is advantageously rolled, wherein the grain is strengthened in the edge region of the material and thus also this surface has an increased load capacity.

In one preferred construction, the screw head of the housing has a collar with a flange surface that can be supported on a camshaft adjuster. The flange surface of the collar contacts an end surface of the camshaft adjuster after successful installation of the central valve with the camshaft adjuster and the camshaft. The collar with its flange surface is formed by the deep-drawing method and the screw head produced in this way has axial flexibility that is needed for the pre-stress in contrast to a flange surface of a solid screw head.

The collar can be oriented as a simple, projecting band in the radial direction, wherein the end surface of one end of the blank points radially outward. In this case, the outer diameter comes as a flange surface in contact with an end side of the camshaft adjuster.

In another construction, this collar formed as a simple, projecting band can be further bent, so that the walls are bent at the end by approximately 180° and the end surface of one end of the blank points in the axial direction. In this case, the end surface comes as a flange surface in contact with an end side of the camshaft adjuster.

A shaft formed by axial swaging of the blank is also conceivable as the collar, wherein the tip extends in the radial direction. In this case, the outer diameter comes as a flange surface in contact with an end side of the camshaft adjuster. No end of the blank here experiences a change in its orientation for the formation of the collar-shaped flange surface.

The flange surface of the collar is oriented in the non-assembled central valve as much as possible in the axial direction, while the collar itself can be formed in the axial and/or radial direction. For increasing the flexibility, the flange surface could also be at an angle to the axis of symmetry of the housing.

In one alternative, preferred construction, the screw head of the housing can be supported with an end surface of its wall on a camshaft adjuster. As mentioned in the description above, a collar with an approximately 180° bend is preferred, so that an end of the blank can be supported on the camshaft adjuster.

In another preferred construction of the invention, the screw head of the housing has a contact surface for an installation tool, wherein a ring-shaped gap is provided between the contact surface and the inner diameter of the housing. For constructing a ring-shaped gap, a collar formed as a screw head is to be provided that has an approximately 180° bend. The contact surface for the installation tool can be arranged on the outer diameter or the inner diameter, but in the axial region of the ring-shaped gap, and is provided for transferring a torque from the tool to the housing. A contact surface can have, e.g., the shape of several individual surfaces, advantageously in the form of flattened sections, in the arrangement of an external hexagon.

In one advantageous construction, the housing has a one-piece stop that is provided for contact on a component arranged within the housing. This stop can be provided for a direct contact with a control piston, an inner housing, or a compression spring. The compression spring can press the control piston advantageously against an actuation pin of a central magnet that can control the axial position of the control piston.

In another construction of the invention, the screw head of the housing has a contact surface for an installation tool that is constructed as an inner surface. Especially for the construction of a shaft formed by axial swaging of the blank as a collar, it is advantageous to provide an inner surface as a contact surface for an installation tool. The inner surface thus can be formed as an inner hexagon or at least as an individual flattened section in the interior of the housing. The contact surface arranged on the inside is provided for transferring a torque from the tool to the housing.

In one advantageous construction, the screw shaft has an outer diameter that is adapted to an inner diameter of a camshaft adjuster that can be connected to a camshaft. If the central valve is placed within the camshaft adjuster, i.e., central valve and camshaft adjuster are arranged one on top of the other in the radial direction, then the outer diameter of the screw shaft corresponds to the inner diameter of the hub of the camshaft adjuster. A surrounding peripheral surface of the thread of the housing is thus smaller than this inner diameter of the hub, so that the hub or the camshaft adjuster can be pushed over the thread and stops at the flange surface of the screw head.

The housing formed according to the invention has the expandability required for a screw for realizing the pre-stress force necessary in exactly dimensioned installation spaces, a very long service life, and is very economical.

DETAILED DESCRIPTION OF THE PREFERRED EMBODIMENTS

Figure 1:
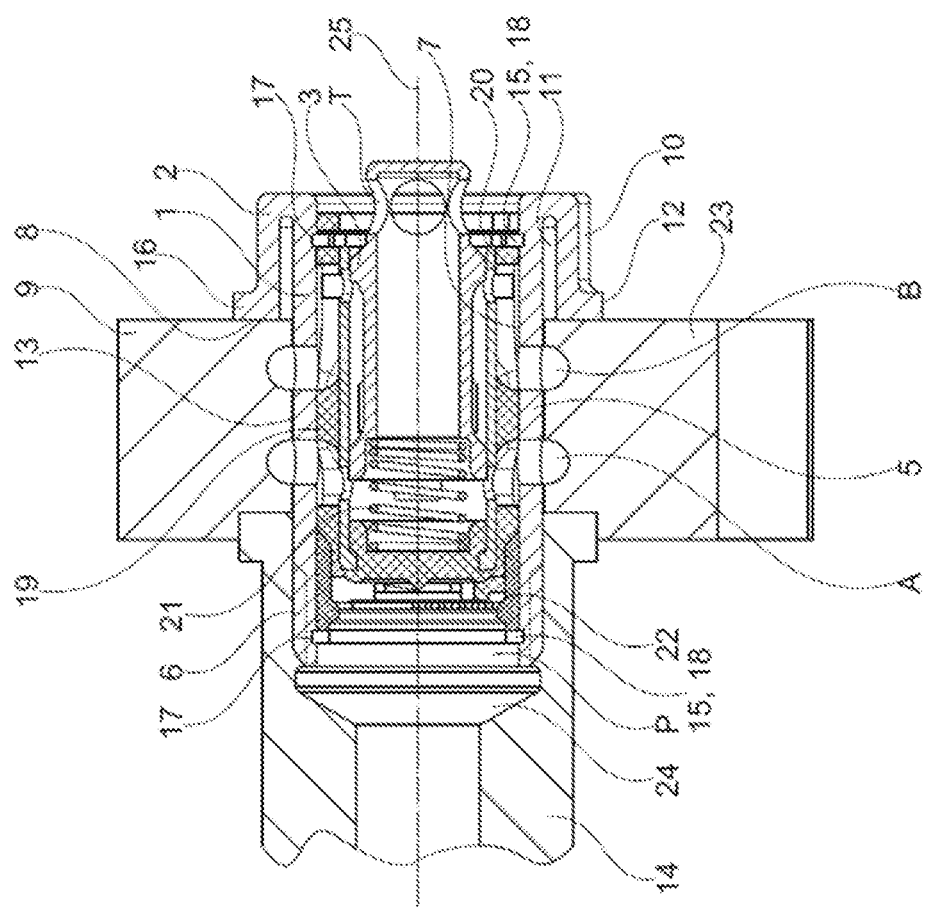
FIG. 1 is an assembly with a central valve according to the invention and a camshaft adjuster and a camshaft.

FIG. 1 shows an assembly with a central valve 1 according to the invention and a camshaft adjuster 9 and a camshaft 14.

The central valve 1 has a deep-drawn housing 2 constructed as a screw, an inner housing 19, a guide sleeve 20, a control piston 3, a compression spring 21, a non-return valve 22 with a filter, and two retaining rings 18 formed as stops 15.

The central valve 1 according to the invention has, in addition to two work connections A, B, a feed connection P and a tank connection T. The feed connection P is arranged within the camshaft 14 and formed as an axial opening of the housing 2 at one end of the central valve 1. The feed connection P opens into a cavity 24 on at least one end of a camshaft 14. The cavity 24 can extend through the entire camshaft 14. The tank connection T is formed by the control piston 3 and is located at the other axial end of the central valve 1. The work connections are arranged as openings on the outer periphery of the central valve 1 and stand opposite openings of the camshaft adjuster 9.

The housing 2 of the central valve 1 is formed as a screw and has at one end a screw head 4 and at the other end a thread area with a thread 6. In-between there is a screw shaft 5. The housing 2 is formed as a deep-drawn part and has approximately the same wall thickness. Through the deep-drawing process, the screw head 4 is bent, starting from a tubular blank of the housing 2, by approximately 180°, i.e., the walls of the tubular blank are shaped so that the axial end of the tubular blank is oriented toward the screw shaft. The resulting bending point is now the axial end of the housing 2. Furthermore, the axial end of the tubular blank of the housing 2 was shaped as collar 16, after which now the end surface 12 of the blank points in a radial direction. Thus, a flange surface 8 that points in the axial direction and is provided for contact with an end surface 23 of the camshaft adjuster 9 is produced by the collar 16. The screw shaft 5 and the thread 6 are left by the tubular blank. The thread 6 is advantageously rolled.

The assembly is held together by a closed flow of forces that leads through the thread 6 that is in turn engaged with an internal thread of the cavity 24 of the camshaft 14, through the camshaft 14 itself, through the camshaft adjuster 9, through the flange surface 8, through the collar 16, through the screw head 4, and through the screw shaft 5 back to the thread 6. The installation can be realized, on one hand, by a preassembly of the camshaft adjuster 9 on the camshaft 14, after which the central valve 1 with the housing 2 formed as a screw secures the assembly with a positive-fit connection locked in rotation. On the other hand, the camshaft adjuster 9 can be penetrated by the central valve 1, after which this preassembled assembly is tensioned with the camshaft 14 with a positive-fit connection locked in rotation. The necessary pre-stress force of this screw connection is advantageously provided by the elasticity of the deep-drawn housing 2, especially the screw shaft 5 and the specially formed screw head 4. The outer diameter 13 of the screw shaft 5 is adapted, to a large extent, to an inner diameter of the camshaft adjuster 9. Thus, the outer periphery of the central valve 1 is in direct contact with the inner periphery of the camshaft adjuster 9.

In the interior of the housing 2 there is an inner housing 19 with a non-return valve 22 attached to this housing. The non-return valve 22 has a disk-shaped filter. The inner housing 19 has, on its inner periphery, a guide sleeve 20 that is formed for guiding the control piston 3. A compression spring 21 exerts a force in the axial direction on the control piston 3, wherein this presses against a stop 15 formed as retaining ring 18. The retaining ring 18 is held by a groove 17 of the housing 2. The housing 2 has, overall, two grooves 17 of each of which a retaining ring 18 is held. One groove 17 is placed in the area of the screw head 4 which is contacted, as mentioned above, by the control piston 3 and also the inner housing 19. The other groove 17 is placed in the area of the thread 6 and thus also in the area of the feed connection P and secures the inner housing 19.

Figure 2A:
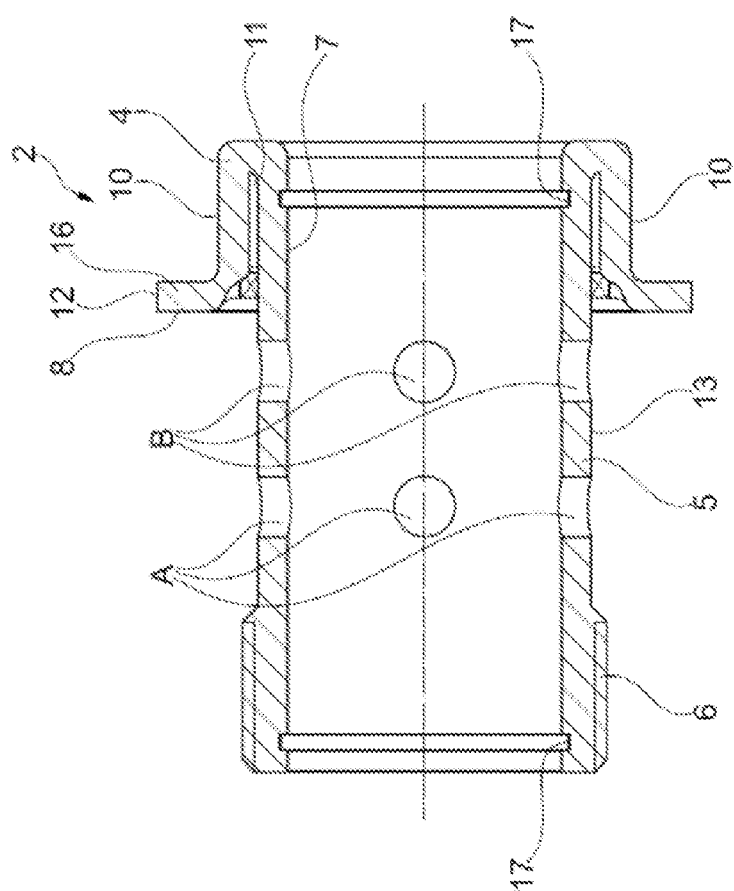
FIG. 2*a* is a view of the housing of the central valve according to the invention according to FIG. 1 in a longitudinal section.

FIG. 2a shows the housing 2 of the central valve 1 according to the invention as per FIG. 1 in a longitudinal section. Below, additional details to the description of the housing 2 from FIG. 1 are given. The work connections A and B are constructed as radial bores in the area of the screw shaft 5. There are four bores for each work connection A or B distributed uniformly over the periphery. The screw head 4 has contact surfaces 10 for an installation tool on its outer periphery. A ring-shaped gap 11 is present between the bent walls for forming the screw head 4. The ring-shaped gap 11 has, in the peripheral direction, a different cross section that is produced by the shaping of the contact surfaces 10.

Figure 2B:
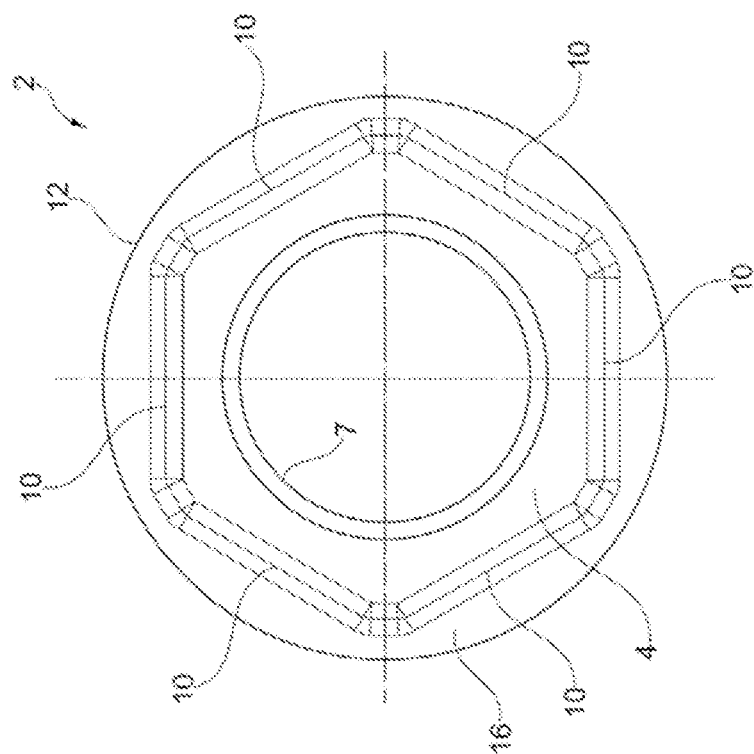
FIG. 2*b* is a top view of the housing according to FIG. 2*a*.

FIG. 2b shows the housing 2 according to FIG. 2a in a top view. The arrangement of the contact surfaces 10 in the shape of an outer hexagon is easily recognizable.

LIST OF REFERENCE NUMBERS

1) Central valve
2) Housing
3) Control piston
4) Screw head
5) Screw shaft
6) Thread
7) Inner peripheral surface
8) Flange surface
9) Camshaft adjuster
10) Attachment surface
11) Ring-shaped gap
12) End surface
13) Outer diameter
14) Camshaft
15) Stop
16) Collar
17) Groove
18) Retaining ring
19) Inner housing
20) Guide sleeve
21) Compression spring
22) Non-return valve with filter
23) End surface
24) Hollow space
25) Rotational axis
A) Work connection
B) Work connection
P) Feed connection
T) Tank connection

The invention claimed is:

1. A central valve comprising: a housing, a control piston arranged within the housing, the central valve has a feed connection (P), several work connections (A, B), and a tank connection (T), the control piston controls a flow of hydraulic medium from the feed connection (P) to the work connections (A, B), and the housing is formed as a screw with a screw head, a screw shaft, and a thread, and the housing is a deep-drawn housing, wherein the screw head of the housing has a contact surface for an installation tool, and a ring-shaped gap is provided between a radially inner surface of the contact surface of the screw head and a radially outer surface of the screw shaft.

2. The central valve according to claim 1, wherein the housing has an inner peripheral surface of constant diameter for guiding the control piston.

3. The central valve according to claim 1, wherein the thread of the housing is constructed as an outer thread and has, together with the screw shaft, a non-stepped outer lateral surface.

4. The central valve according to claim 1, wherein the screw head of the housing has a collar with a flange surface that can be supported on a camshaft adjuster.

5. The central valve according to claim 1, wherein the screw head of the housing is supported with an end surface of walls that form the screw head on a camshaft adjuster.

6. The central valve according to claim 1, wherein the housing has a one-piece stop that is provided for contact with a component arranged within the housing.

7. The central valve according to claim 4, wherein the screw head of the housing has a contact surface for an installation tool that is formed as an inner surface.

8. Central valve according to claim 1, wherein the screw shaft has an outer diameter that is adapted to an inner diameter of a camshaft adjuster that can be connected to a camshaft.

* * * * *